Patented Jan. 21, 1947

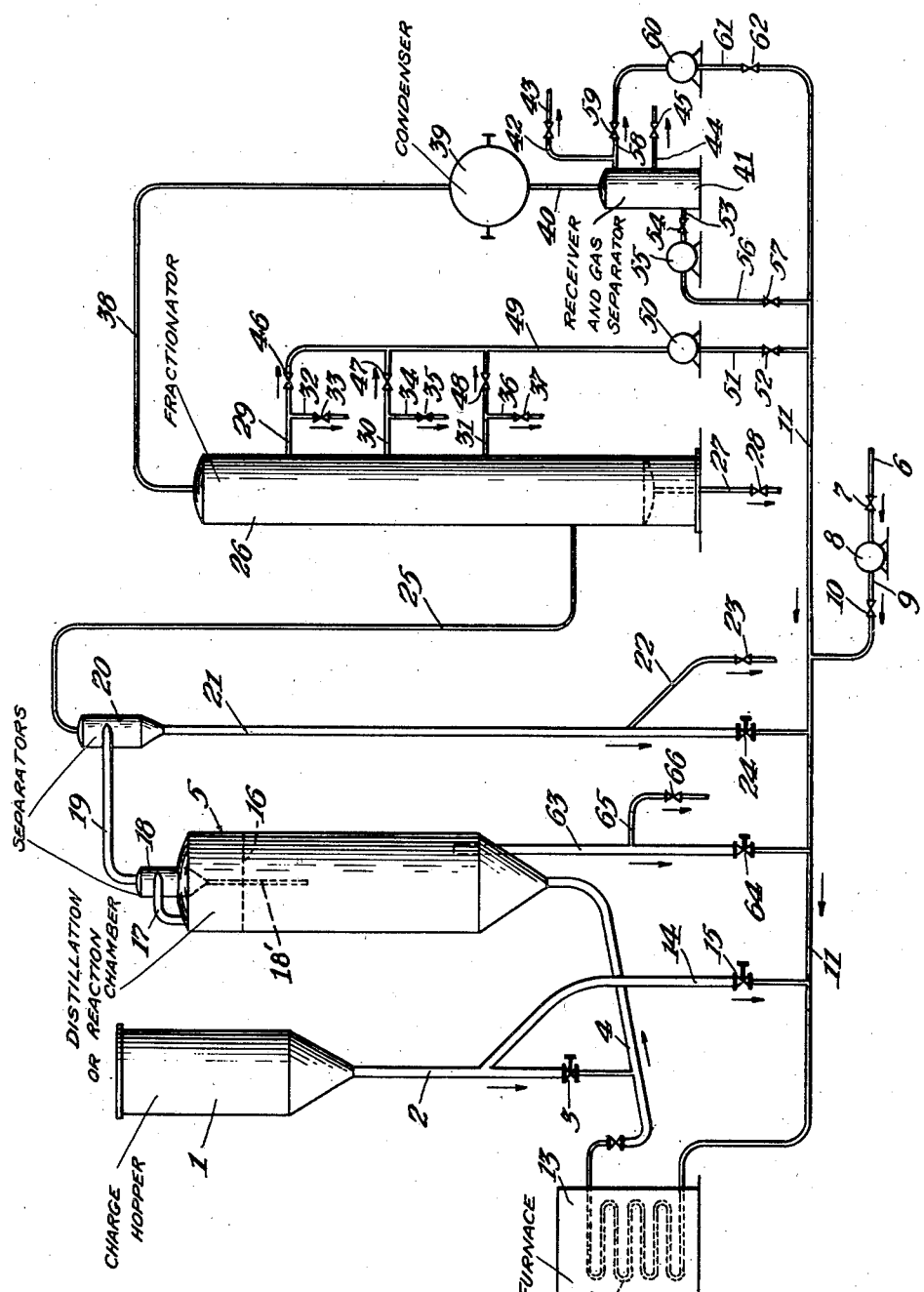

2,414,586

UNITED STATES PATENT OFFICE 2,414,586

DISTILLATION OF HYDROCARBONACEOUS SOLIDS

Gustav Egloff, Chicago, Ill., assignor to Universal Oil Products Company, Chicago, Ill., a corporation of Delaware Application September 5, 1942, Serial No. 457,401

8 Claims. (Cl. 202—15)

1

The invention is directed to an improved process for the distillation of hydrocarbonaceous solids, such as coal, peat, lignite, oil shale and the like to recover valuable liquid and/or gaseous hydrocarbons therefrom.

The distillation of hydrocarbonaceous solids is ordinarily accomplished by batch operation in externally heated retorts, or heat for effecting their distillation is derived by partial combustion of the material undergoing distillation in an oxidizing atmosphere. The present invention provides for the continuous distillation of such materials and obviates the use of expensive and troublesome externally heated retorts and the like It also provides a method of effecting the continuous distillation of hydrocarbonaceous materials without commingling or contamination of the valuable gaseous and liquid products with combustion gases, obviating the difficult problem of effecting the separation of hydrocarbon gases from combustion gases and also avoiding the loss of the charging material which is encountered when partial combustion thereof is employed to generate heat for its distillation.

One important feature of the invention resides in reducing the solid hydrocarbonaceous material to a finely divided or pulverulent state and supplying it to a vessel wherein a substantial body of the subdivided solid material is maintained in turbulent fluid state and contacted with a non-oxidizing vaporous or gaseous heat-carrying medium which is passed upwardly through said bed, keeping the same in turbulent fluid condition and supplying heat to the subdivided solid material of the bed for effecting the distillation of volatiles therefrom.

Another feature of the invention resides in the use of hot hydrocarbon gases or oil vapors as the fluidizing and heating medium for the subdivided solid material. Any hydrocarbon oil or gas which will remain in essentially vaporous or gaseous state under the conditions employed in the distilling zone may be employed for this purpose, including such materials as natural gas, refinery gases, gas oil, kerosene, kerosene distillate, naphtha and the like. The material selected for this purpose is one which will not contaminate the desired gaseous or liquid products of the process and the invention specifically contemplates the use of oil and/or gas produced within the system as the fluidizing and heating medium. The material thus employed is passed through a heating coil wherein it is heated to a temperature suitable for effecting the distillation of volatiles from the hydrocarbonaceous solids and is directed, while still in highly heated state, into the afore-

2 said bed of the latter maintained in the distilling zone to fluidize and supply heat thereto for effecting said distillation. When desired, all or a portion of the solid material to be distilled may be commingled with the heating medium and passed therewith through the heating coil or it may be supplied, all or in part, directly to the distilling zone or commingled with the heating medium passing from the heating coil to the distilling zone.

By effecting distillation of the solid material while it is in finely divided, fluidized state, the benefits of extended surface area and better penetration of heat into the solid material are obtained. Substantially uniform contact between the heating medium and the solid material and a substantially uniform temperature throughout the mass of solid material undergoing treatment are also obtained as a result of maintaining the bed in turbulent fluid state.

The heat-carrying medium is introduced into the distilling or reaction vessel wherein said bed of subdivided solid material is maintained at a net upward velocity greater than that of the particles which compose the bed. This results in the phenomenon known as "hindered settling," imparting a cyclic flow to the subdivided particles of the bed through the upper and lower portions thereof and maintaining it in a turbulent state resembling that of a boiling liquid. In the lower portion of the bed the concentration of solid particles in the gaseous or vaporous heat-carrying medium is relatively high, but a materially lower concentration of solid particles will prevail in the upper portion of the bed. Thus, the bed has a relatively heavy lower phase and a materially lighter upper phase. Relatively light particles comprising a solid residual product of the distilling operation tend to concentrate in the relatively light phase of the fluid bed and are removed therefrom together with volatiles evolved from the hydrocarbonaceous material and the vaporous or gaseous heat-carrying medium to suitable separating equipment wherein substantially all of the solid particles are separated from the vapors and gases.

A major portion of the solid material from which vaporizable constituents have been incompletely removed will remain in the dense phase of the bed until distillation is substantially completed. However, some incompletely distilled particles will be removed from the light phase with the lighter residual solid material and, in the preferred embodiment of the invention, they are substantially separated from the lighter solid particles and returned to the dense phase of the fluid bed. To accomplish this two stages of separation are employed, in the first of which the incompletely distilled, relatively heavy solid particles are separated from a mixture of the lighter particles with the vapors and gases while the second stage is employed for separation of the remaining solid particles from the vapors and gases. Thus, the residue of the solid material, after substantially all of the vaporizable constituents have been recovered therefrom, may be removed from the separating equipment and from the system. The invention also contemplates commingling regulated quantities of this material, when desired, with the heating medium prior to passage of the latter through the heating coil. This will greatly increase the heat-carrying capacity of the heating medium and improve heat transfer rates both in the heating coil and in the fluid bed. It will also materially reduce the pumping costs by reducing the quantity of gas or vaporizable liquid which must be passed through the heating coil in a given time.

Vapors and gases are directed from the separating equipment for solid particles to suitable fractionating and recovery equipment wherein they are separated into any desired number of selected normally liquid and normally gaseous fractions, and provision is made for returning selected fractions of the normally liquid or gaseous products in regulated quantities through the heating coil back to the distilling zone to serve as all or a portion of the heating medium.

Although the foregoing description refers to the treatment afforded the subdivided hydrocarbonaceous material as "distillation," the use of this term and similar terms herein is not intended to preclude employing temperature and pressure conditions in the fluid bed and/or in the heating coil which will result in thermal decomposition or cracking of all or a portion of the hydrocarbons, including either those evolved from the solid hydrocarbonaceous material or those employed as the heating medium, or both. Whether destructive or non-destructive distillation is obtained will depend upon the operating conditions of temperature, pressure and time employed which may be regulated to suit requirements and to obtain either non-destructive distillation or cracking.

The accompanying drawing diagrammatically illustrates one specific form of apparatus in which the process provided by the invention may be conducted.

Referring to the drawing and to the operation of the apparatus here illustrated, the finely subdivided or pulverulent hydrocarbonaceous material to be treated is supplied by any well known means, not illustrated, to a charge hopper 1 from which it gravitates through standpipe 2 and is admitted, all or in part, through the flow-control valve 3 into line 4. It is picked up in line 4 by a hot vaporous or gaseous heating and transporting medium, derived as will be later described, and is directed therewith into the lower portion of a vertically disposed distillation or reaction chamber 5 wherein a bed of the subdivided solid material is maintained in turbulent fluid state by the lifting action of the heating and transporting medium and by the action of gravity which tends to make the solid particles settle. These opposing forces give the bed of solid particles a mobility and turbulence resembling that of boiling liquid. Thus, thorough and intimate contact is obtained between the heating medium and the subdivided hydrocarbonaceous material and good heat distribution is obtained throughout the distilling zone.

In starting the operation, gas such as natural or refinery gas, or selected fractions thereof, for example, or a liquid such as hydrocarbon oil which will remain in essentially vaporous state under the temperature and pressure conditions employed in the distilling zone is supplied from storage or elsewhere, as desired, through line 6 and valve 7 to pump or compressor 8 wherefrom it is fed through line 9, valve 10 and line 11 to heating coil 12 disposed in furnace 13. In passing through coil 12 the heat-carrying medium is brought to a temperature suitable for effecting either non-destructive distillation or cracking of the hydrocarbonaceous material to be treated and is discharged from the coil through line 4 wherein it picks up subdivided solids from hopper 1 and transports the same to chamber 5, as previously mentioned.

When desired, subdivided solids to be treated may be supplied from hopper 1 and standpipe 2 through the branch standpipe 14 and flow-control valve 15 into line 11, to be picked up therein by the gaseous or liquid material passing therethrough and transported through the heating coil and thence to chamber 5. Preheating of the solid charge in this manner will decrease the quantity of gaseous or vaporous material from coil 3 necessary to effect distillation in chamber 5. When desired, a portion of the solid charge from hopper 1 may be supplied to line 11 and another portion to line 4, in the manners previously described, and also, when desired, well known means, not illustrated, may be provided for supplying regulated quantities of the subdivided solid material from hopper 1 directly to chamber 5.

The approximate location of the interface between the relatively light upper and lower dense phases of the fluid bed in chamber 5 is indicated at 16. The mixture of the volatiles evolved from the subdivided solid material in the distilling step with the heat-carrying medium and with devolatilized and partially devolatilized particles of the solid material is directed from the upper or light phase of the fluid bed through line 17 to a suitable separator 18. In the case illustrated the separator is of the cyclone type and it functions to separate the heavier solid particles from the vapors and gases. These heavier solid particles will consist principally of only partially devolatilized solids and, in the case illustrated, are returned from separator 18 through standpipe 18' to the dense phase of the fluid bed in chamber 5 for further treatment.

Gases and vapors containing lighter solid particles not removed in separator 18 are directed therefrom through line 19 to a secondary separator 20 which in the case illustrated is similar to separator 18 and wherein all or a major portion of the remaining subdivided solids are separated from the gases and vapors. The solid particles disengaged from the vapors and gases in separator 20 may contain some material not devolatilized to the desired degree but will consist largely of residual solid material of the nature of coke or ash, in the case of coal distillation, or of a siliceous nature in the case of most oil shales. This material is directed from separator 20 through standpipe 21 and regulated quantities thereof are discharged from the system through line 22 and valve 23 as a finely divided, solid, residual product of the operation.

Provision is also made for returning regulated quantities of this material, which will contain considerable residual heat, through flow-control valve 24 in standpipe 21 to line 11 to commingle therein with the liquid or gaseous heat-carrying medium being supplied therethrough to coil 12. This will increase the temperature of the heat-carrying medium being supplied to coil 12 and will also improve heat transfer rates in the coil by increasing the density of the stream flowing therethrough and will give the heating medium a greater heat-carrying capacity. It is particularly advantageous to employ this mode of operation when only a small amount or none of the solid charge from hopper 1 is supplied to the heating coil, although it may be employed in conjunction with transportation of the solid charging stock through the coil, either or both of these materials serving to increase the specific heat of the heat-carrying medium per unit volume by loading it with a material of greater density, particularly as compared with the vaporous or gaseous material discharged through coil 13.

Vapors and gases from separator 20 are directed through line 25 to fractionator 26 wherein relatively light and relatively heavy components thereof are separated into any desired number of selected fractions. In the case illustrated, the heaviest fractions are condensed and removed as bottoms from fractionator 26 through line 27 and valve 28 to cooling and storage or to any desired further treatment. A plurality of selected intermediate fractions are removed as condensate from various points in the fractionator through lines 29, 30 and 31 and may be discharged, all or in part, from the system to storage or elsewhere, as desired, through the respective communicating lines 32, 34 and 36, controlled respectively by valves 33, 35 and 37.

Gases and light vapors of the desired end-boiling point are directed from the upper portion of the fractionator through line 38 to condenser 39, wherefrom resulting distillate and remaining uncondensed and undissolved gases are directed through line 40 to collection and separation in receiver 41. Uncondensed and undissolved gases may be released from the receiver through line 42 and valve 43 and distillate collected in receiver 41 may be withdrawn therefrom through line 44 and valve 45.

When desired, regulated quantities of the distillate collected in receiver 41 and/or regulated quantities of any or all of the condensates, removed from the fractionator as previously described, may be returned to one or a plurality of suitable points in the fractionator to serve as cooling and refluxing medium.

I specifically contemplate the use of condensate recovered from fractionator 26 or distillate or gas from receiver 41, or any desired mixture of such materials, as the vaporizable or gaseous component of the heat-carrying medium. Any or all of these materials may be stored in suitable equipment, not illustrated, for transportation by pump or compressor 8 to the heating coil during the entire operation of the process or during its initial stages. During normal operation of the process, condensate removed from fractionator 26 through any or all of the lines 29, 30 and 31 may be directed, while still in heated state, through the respective valves 46, 47 and 48 and through line 49 to pump 50 by means of which this material is returned through line 51, valve 52 and line 11 to heating coil 12. Distillate from receiver 41 may be directed therefrom through line 53 and valve 54 to pump 55 and supplied therefrom in regulated quantities through line 56, valve 57 and line 11 to heating coil 12. Uncondensed and undissolved gases may be directed from receiver 41 through line 58 and valve 59 to compressor 60 and returned in regulated quantities through line 61, valve 62 and line 11 to heating coil 12.

As previously indicated, when the condensate from fractionator 26 is employed as the heat-carrying medium or as a component thereof, the condensate chosen for this use is preferably one which will be substantially completely vaporized in coil 12 and will remain in essentially vaporous state in the distilling chamber. This also applies to oil employed as a heat-carrying medium and derived from an external source. The material thus used, whether derived from within the system or from an outside source, may be one which is relatively refractory to cracking and will not be thermally decomposed to any substantial extent under the conditions to which it is subjected in coil 12 and chamber 5 or it may be an intermediate product of the process or oil or gas from an external source which is advantageously subjected to cracking treatment by passage through the system. For example, I specifically contemplate the use of liquid fractions, such as gas-oil, kerosene or kerosene distillate, naphtha and the like from an external source and/or substantially corresponding fractions derived from within the system as the heat-carrying medium, subjecting the same to cracking conditions in coil 12 and cooling the resulting essentially vaporous products in line 4 to below an active cracking temperature by commingling relatively cool hydrocarbonaceous solid material from hopper 1 therewith in line 4, the mixture thence passing to chamber 12 wherein a temperature suitable for effecting non-destructive distillation of the solid hydrocarbonaceous material is maintained. Alternatively, a distillate or gas, which will not substantially decompose at the temperature requisite for effecting distillation of the hydrocarbonaceous solid material, may be employed and subjected to a temperature in coil 12 below that at which active cracking will occur. In the latter case a substantial portion or all of this material is available for recovery and recycling through the system.

When relatively high temperatures are employed in coil 12 it may not be necessary to pass either subdivided solid charging stock from hopper 1 or separated solid material from separator 20 through the coil in order to maintain the desired distillation temperature in chamber 5, but ordinarily it will be advantageous to pass regulated quantities of one or both of these materials through the coil and, when desired, conditions may be employed in chamber 5 which will result in the cracking therein of volatiles divided from the hydrocarbonaceous solid material and/or continued cracking in chamber 5 of the heat carrying medium passed through coil 12.

The recirculation through coil 12 of subdivided solid material removed from the dense phase of the fluid bed in chamber 5 is also within the scope of the invention and this may be accomplished by directing regulated quantities of this material from the dense phase in chamber 5 through line 63 and flow-control valve 64 to line 11. Also, when desired, regulated quantities of subdivided solid material may be continuously or intermittently removed from the dense phase of the fluid bed in reactor 5 and from the system through line 65 and valve 66 communicating with line 63.

In some instances there may be a tendency for the subdivided solid material to pack in the lines or standpipes through which this material is transported by gravity from hopper 1, separator 20 or chamber 5, so that its flow therethrough will be unduly restricted or stopped. In such instances, well known means, not illustrated, may be provided for introducing small quantities of gas, steam or the like into these lines or standpipes at one or a plurality of points along their length to pass upwardly through the column of solid material therein and reduce its density sufficiently to insure the proper downward flow of the solid particles.

I claim as my invention:

1. The process of distilling hydrocarbonaceous solids, to recover valuable volatile constituents therefrom, which comprises introducing said solid material in finely divided state into a confined distilling zone, therein maintaining a bed of said subdivided solid particles in turbulent fluid state and effecting the distillation of volatiles therefrom by heating a stream of non-oxidizing fluid in a heating coil to a temperature adequate to effect said distillation and thereafter introducing the hot fluid upwardly into said bed, removing resulting fluid containing evolved volatiles and entrained solid particles from the upper portion of said bed, separating heavier solid particles from said stream and returning the same to said bed, thereafter separating additional solid particles from said stream and supplying at least a portion thereof to said heating coil for heating therein together with said non-oxidizing fluid removing regulated quantities of said solid particles from the lower region of said bed, commingling them with said non-oxidizing fluid and passing the same with the latter through said heating coil back into the distilling zone.

2. A process such as defined in claim 1 wherein regulated quantities of the subdivided solid charging material are supplied to the distilling zone by commingling the same with said stream of non-oxidizing fluid being supplied to the heating coil and passed therewith through the heating coil into the distilling zone.

3. A process such as defined in claim 1 wherein said non-oxidizing fluid comprises normally gaseous fractions separated from the products of the distilling operation.

4. A process such as defined in claim 1 wherein said non-oxidizing fluid comprises intermediate, readily vaporizable, normally liquid fractions separated from the products of the distilling operation.

5. A process such as defined in claim 1 wherein said non-oxidizing fluid comprises hydrocarbons derived from an external source.

6. A process such as defined in claim 1 wherein the solid hydrocarbonaceous charging material comprises coal.

7. A process such as defined in claim 1 wherein the solid hydrocarbonaceous charging material comprises oil shale.

8. The process of distilling hydrocarbonaceous solids, to recover valuable volatile constituents therefrom, which comprises introducing said solid material in finely divided state into a confined distilling zone, therein maintaining a bed of said subdivided solid particles in turbulent fluid state and effecting the distillation of volatiles therefrom by heating a stream of non-oxidizing fluid in a heating coil to a temperature adequate to effect said distillation and thereafter introducing the hot fluid upwardly into said bed, removing resulting fluid containing evolved volatiles and entrained solid particles from the upper portion of said bed, separating heavier solid particles from the withdrawn fluid stream and returning the same to said bed, removing regulated quantities of said solid particles from the lower region of said bed and commingling them with said non-oxidizing fluid and passing the same with the latter through said heating coil back into the distilling zone.

GUSTAV EGLOFF.